Nov. 25, 1958 — M. VILLARD — 2,861,438
UNIVERSAL JOINTS
Filed June 6, 1955 — 5 Sheets-Sheet 1

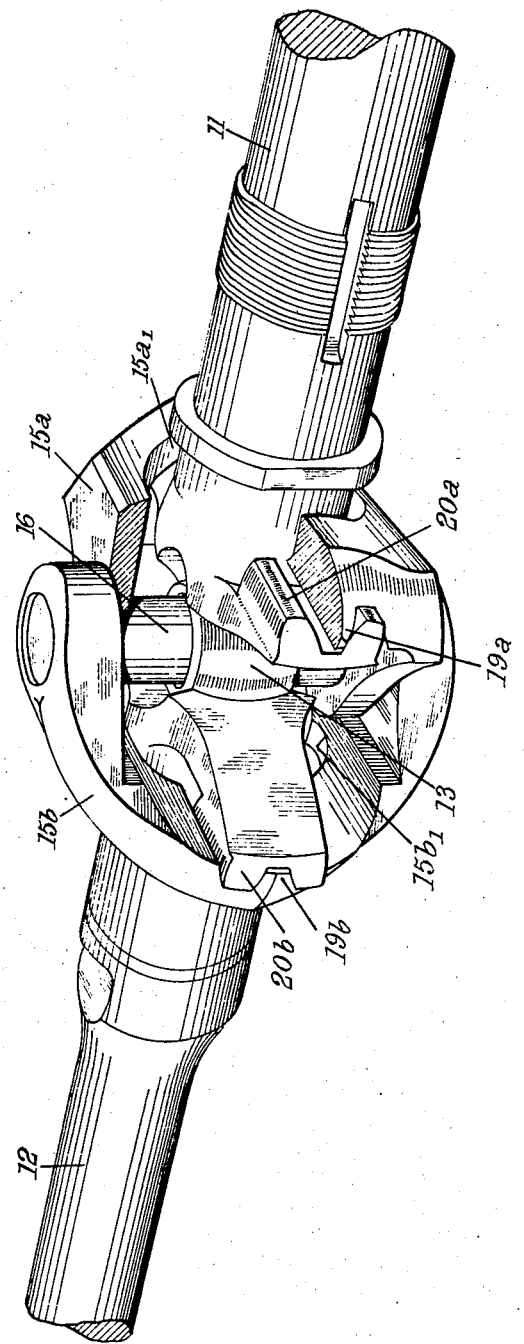

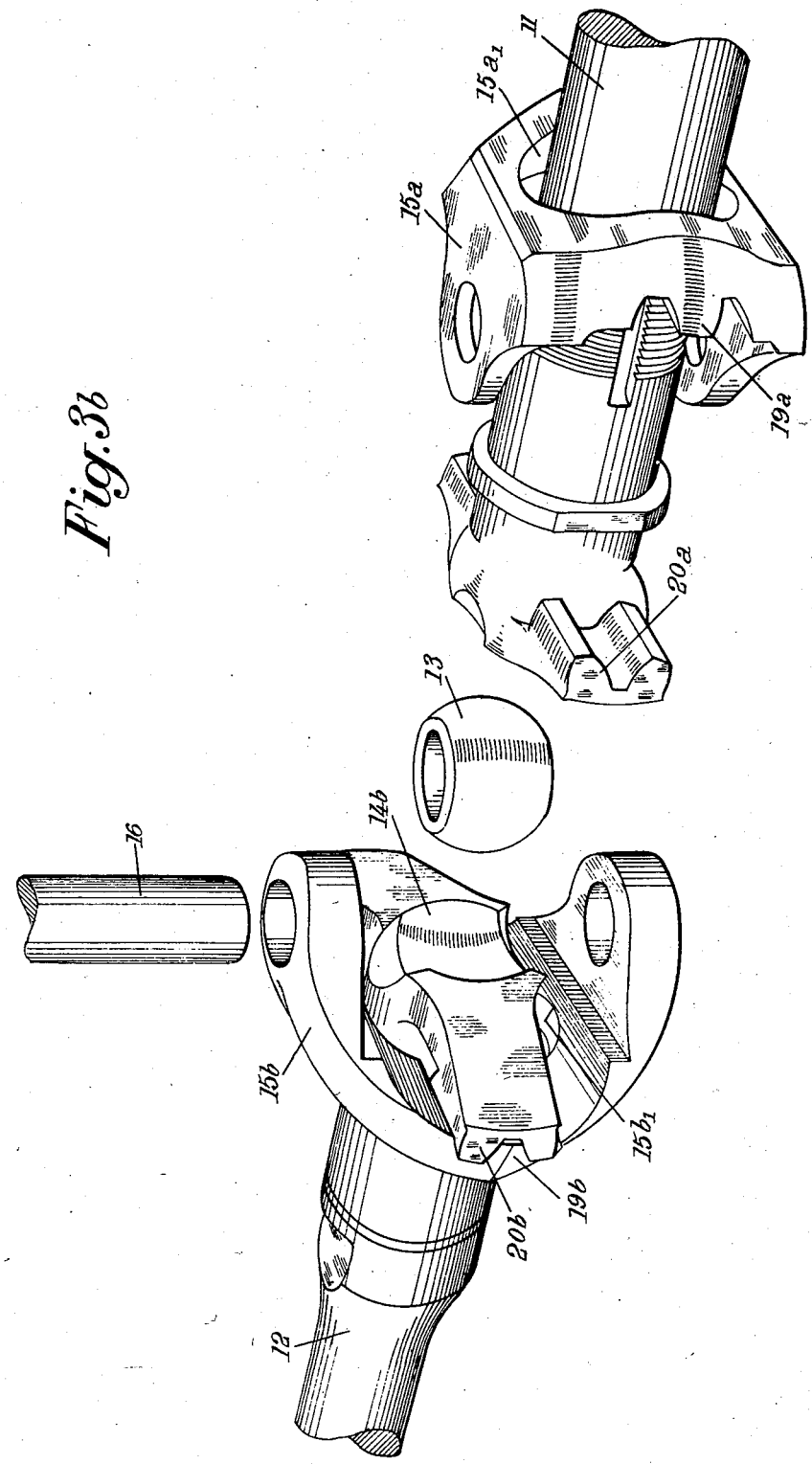

Nov. 25, 1958  M. VILLARD  2,861,438
UNIVERSAL JOINTS
Filed June 6, 1955  5 Sheets-Sheet 5
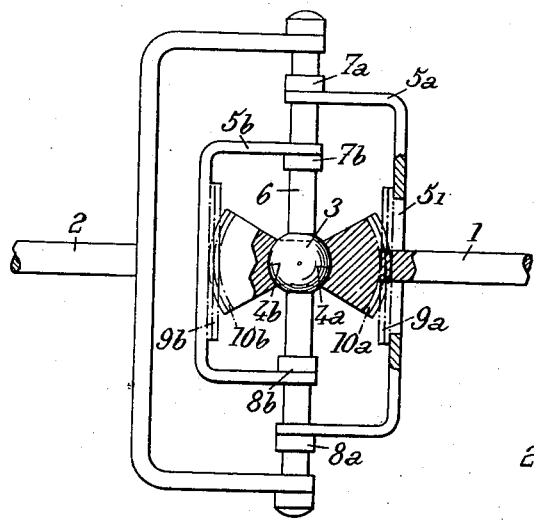
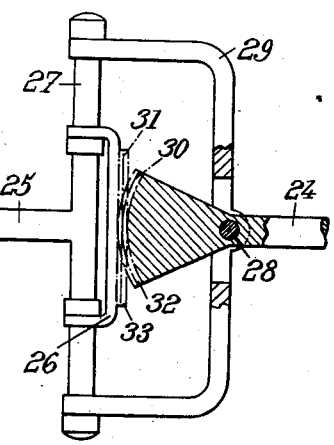
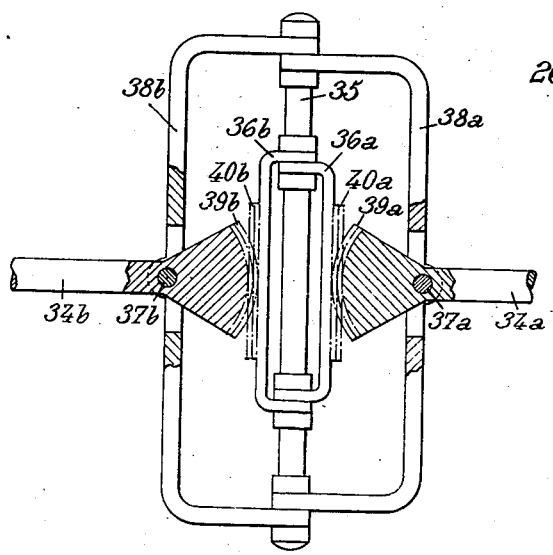

United States Patent Office 2,861,438
Patented Nov. 25, 1958

2,861,438

UNIVERSAL JOINTS

Marcel Villard, Cormeilles-en-Parisis, France

Application June 6, 1955, Serial No. 513,528

Claims priority, application France June 9, 1954

1 Claim. (Cl. 64—21)

The present invention relates to universal joints. Its object is to provide a joint of this kind which is better adapted to meet the requirements of practice than those known up to the present time, and in particular such that, for given dimensions, its strength is improved and its manufacture is made simpler.

According to my invention, the universal joint includes, for coupling together two elements of said joint, such as, for example, a driving shaft and a driven shaft thereof, a rigid connecting member which is both rotatable with respect to the first of these two elements about a given axis of rotation and movable with respect to this element in parallel to said axis of rotation, the second element of the joint being rotatable with respect to said connecting member about an axis of rotation at right angles to the first mentioned axis, said second element of the joint and said connecting member being respectively provided with surfaces adapted to roll without slipping on each other, whereby the torque applied through the universal joint can be transmitted between the second element and the connecting member through said surfaces. In order to achieve this rolling displacement without slipping and, therefore, torque transmission, said two surfaces are advantageously toothed gears in mesh with each other.

Preferred embodiments of my invention will be hereinafter described with reference to the accompanying drawings, given merely by way of example and in which:

Fig. 3a is a perspective view of the structure of Fig. 2, slightly modified, the structure being partially broken away to illustrate hidden structure.

Fig. 3b is a partially exploded view of the structure shown in Fig. 3a.

Fig. 4 shows a universal joint made according to a modification of that of Fig. 1.

Figs. 5 and 6 diagrammatically show a two-centre simple joint and a three-centre double joint respectively, made according to the present invention.

Figure 1:
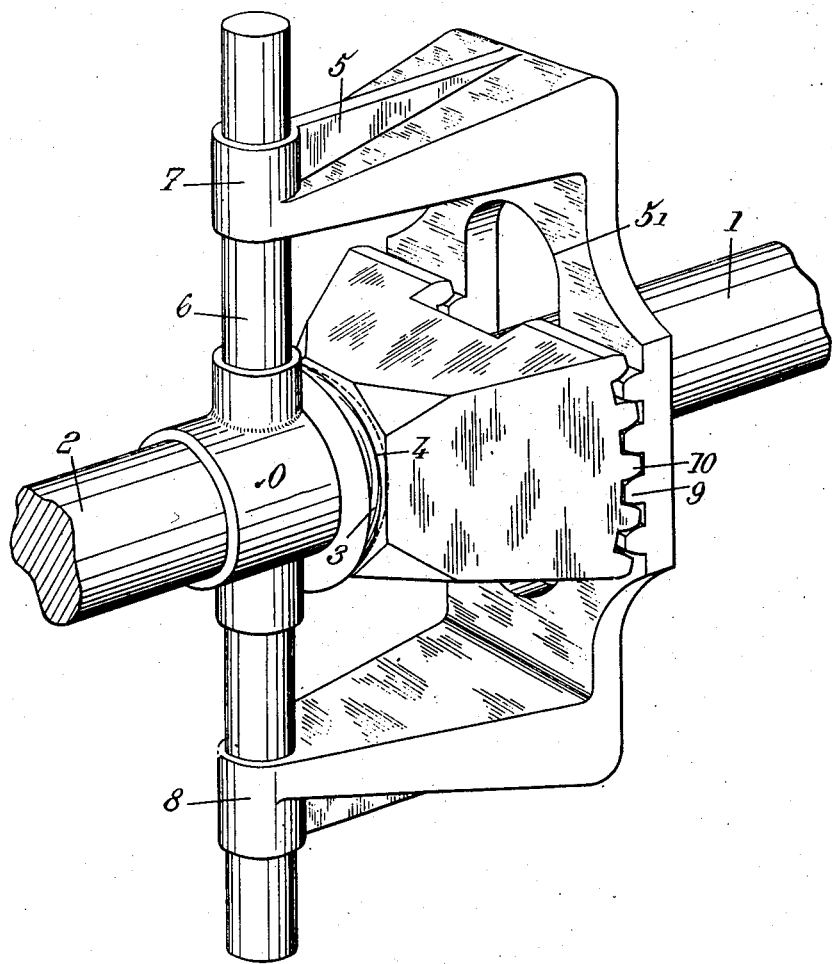
Fig. 1 is a perspective view of a single centre simple joint made according to the invention.

In the construction of Fig. 1, the two above-mentioned elements of the joint are constituted by the driving and driven shafts 1 and 2.

The joint is provided with means for causing the axis of shaft 1 to pass always through a point O of the axis of shaft 2. Such means are advantageously constituted by a convex spherical bearing 3 provided at the end of shaft 2 and a concave spherical bearing 4 having the same radius and provided at the end of shaft 1, these two bearings being fitted in each other. The centre of bearing 3 coincides with point O.

Shafts 1 and 2 are connected together by means of a yoke or fork 5 which is both rotatable with respect to shaft 2 about an axis at right angles to shaft 2 passing through point O and movable with respect to said shaft 2 in parallel to said axis of rotation. For this purpose, in the construction shown by the drawings, shaft 2 carries a transverse shaft 6 on which cylindrical sleeves 7 and 8 rigid with the branches of fork 5 are both slidable and rotatable. The sleeves 7 and 8 cooperate respectively with portions of transverse shaft 6 located on opposite sides of shaft 2. Yoke 5 is provided with an elongated aperture $5_1$ through which passes the other shaft 1. The middle plane, or plane of longitudinal symmetry, of said aperture passes through the axis of transverse shaft 6.

Yoke 5 and shaft 1 are respectively provided with surfaces adapted to roll without slipping on each other. For this purpose, the middle portion of yoke 5 is provided with teeth 9 forming a rack on a face of said yoke portion turned toward point O. The end of shaft 1 carries cylindrical teeth 10 the axis of which passes through point O and is perpendicular to the axis of transverse shaft 6. These teeth 10, which mesh with rack 9, may be carried either directly by an enlarged portion of the end of shaft 1, or by a piece fixed to said end of shaft 1.

The operation of this joint is as follows.

If it is supposed that shaft 1 is the driving shaft and shaft 2 the driven shaft, the driving torque is transmitted from shaft 1 to yoke 5 through the cooperating teeth 10 and 9 carried by said parts, and it is then transmitted from yoke 5 to shaft 2 through sleeves 7 and 8 and transverse shaft 6.

If the joint is deformed from the position shown by Fig. 1 by a relative rotation of shafts 1 and 2 about the axis of transverse shaft 6, the whole of shaft 1 and yoke 5 then turns without being deformed about this axis.

If the joint is deformed from the position shown by Fig. 1 by a relative rotation of shafts 1 and 2 about an axis at right angles to that of shaft 6, the teeth carried by shaft 6, which is pivoting about point O, move upwardly or downwardly, thus driving yoke 5 which slides along transverse shaft 6.

If the joint is deformed by a relative rotation of shafts 1 and 2 about any axis passing through point O, the two above indicated deformations of the joint are combined. Therefore the joint of Fig. 1 can, under all circumstances, be deformed freely while transmitting the desired torque.

In the modification of Fig. 4, the spherical bearing surface 3 constitutes a nearly complete sphere and is carried by transverse shaft 6. Shaft 1 includes two spherical concave bearing surfaces $4a$ and $4b$ cooperating with said spherical part 3 and said shaft 1 is also provided with two toothed gears $10a$ and $10b$ disposed on either side of part 3. Two yokes $5a$ and $5b$, provided with toothed gears $9a$ and $9b$ cooperating with $10a$ and $10b$, are mounted on shaft 6. The operation of this joint is the same as that of Fig. 1 but its strength is increased.

In another embodiment of my invention, a double joint is obtained by constituting the two elements of every half of said joint respectively by the driving or the driven shaft and by an element common to the two halves of the joint, this element being preferably in the form of a portion of a sphere.

Figure 2:
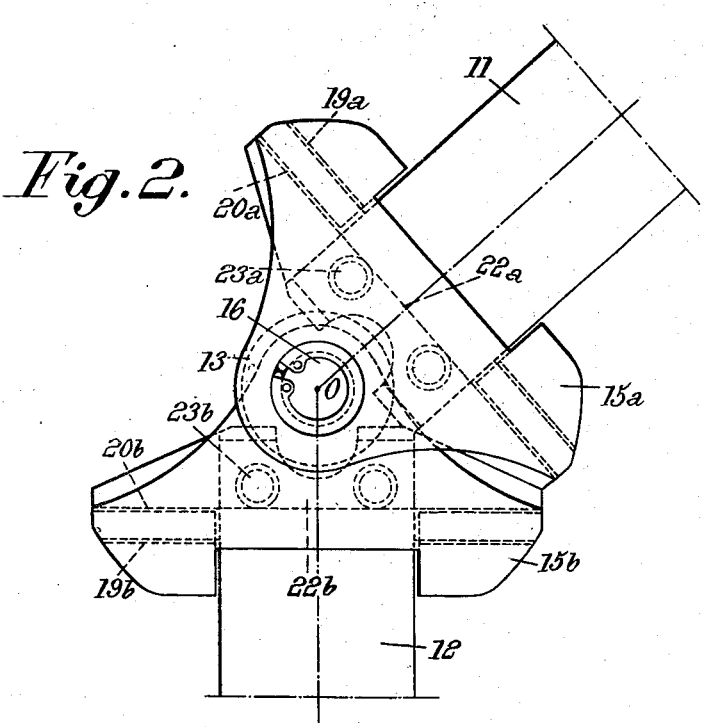
Fig. 2 is an elevational view of a single centre double joint made according to another embodiment of the invention.
Figure 3:
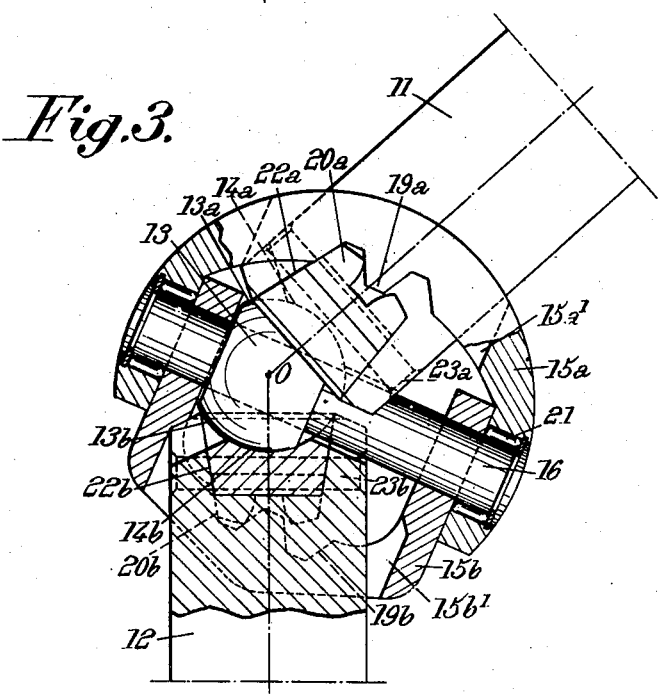
Fig. 3 is a part sectional view of the universal joint of Fig. 2 after rotation through 90° of its two shafts about their respective axes.

In the construction of Figs. 2 and 3 (see also Figs. $3a$ and $3b$), the respective axes of the driving and driven shafts 11 and 12 intersect each other at the centre O of an element 13, and for this purpose, advantageously, this element 13 is provided with two spherical convex bearing surfaces $13a$ and $13b$ cooperating with corresponding concave bearing surfaces $14a$ and $14b$ carried by the ends of shafts 11 and 12 respectively.

Shafts 11 and 12 are interconnected through means including two yoke-shaped members 15a and 15b, each of which is both rotatable with respect to element 13 and movable with respect thereto in parallel to the common axis of rotation of said yokes.

For this purpose, one of the yokes (15b for instance) carries a transverse shaft 16 and the second yoke (in this case 15a) is pivoted about the same axis 16, advantageously with the interposition of rollers 21, and the element 13 is mounted on shaft 16 in such manner that it can slide with respect thereto. Yokes 15a and 15b are provided with elongated apertures $15a_1$ and $15b_1$ through which shafts 11 and 12 respectively pass. The longitudinal planes of symmetry of said apertures respectively pass through the axis of shaft 16. Shafts 11 and 12 may be provided with parallel cheeks bearing with a smooth fit against the sides of apertures $15a_1$ and $15b_1$.

The ends of shafts 11 and 12 carry cylindrical toothed gears 20a and 20b the respective axes of which pass each through point O and are perpendicular to the axis of shaft 16. The yokes 15a and 15b carry toothed gearings in the form of racks 19a and 19b.

In the construction illustrated by the drawings, the toothed gears 20a and 20b are respectively carried by pieces 22a and 22b fixed transversely to the end of shafts 11 and 12 and secured by means of rivets 23a and 23b.

Figs. 3a and 3b, which are substantially perspective views of the structure of Fig. 2, illustrate that these toothed portions might be cut in enlarged ends of said shafts 11 and 12.

Such a double joint works as follows.

If it is supposed that shaft 11 is the driving shaft and shaft 12 is the driven shaft of the joint, the torque is transmitted from shaft 11 to yoke 15a through teeth 19a and 20a and also possibly by the action of the cylindrical wall of shaft 11 on the sides of aperture $15a_1$, then from yoke 15a to yoke 15b through shaft 16, and finally from yoke 15b to shaft 12 through teeth 20b and 19b and possibly through the action of the sides of aperture $15b_1$ bearing against the cylindrical wall of shaft 12.

If the joint is deformed by a relative rotation of shafts 11 and 12 about the axis of shaft 16, each of the units formed by shaft 11 and yoke 15a on the one hand, and shaft 12 and its yoke 15b on the other hand, turns without deformation about the axis of shaft 16, the position of element 13 remaining unchanged.

If the joint is deformed by a relative rotation of shafts 11 and 12 about an axis at right angles to the plane of Fig. 3, teeth 20a and 20b move teeth 19a and 19b respectively while driving the whole of yokes 15a, 15b and shaft 16, which whole then slides with respect to element 13.

If the joint is deformed by a relative rotation of shafts 11 and 12 about any axis whatever, the displacements above stated of the elements of the joint are combined. Therefore, the joint of Figs. 2 and 3 can, in all circumstances, deform freely while transmitting torque.

The two elements of the joint may be pivoted about axes which do not intersect each other and are at right angles.

In the construction of Fig. 5, a simple joint is obtained by constituting the two above mentioned elements by the driving and driven shafts 24 and 25 of this joint, the interconnecting element being a yoke 26 which is both slidable and rotatable on a transverse shaft 27 rigid with shaft 25. Shaft 24 is pivoted on an axis 28 kept at right angles to the axis of shaft 27 by means of a U-shaped member 29 pivoted on shaft 27 without being slidable thereon.

Shaft 24 includes, beyond axis 28, a surface of revolution 30 and yoke 26 includes a surface having rectilinear generatrices 31, these two surfaces being arranged to roll without slipping on each other. For this purpose, the whole or a part of these surfaces is in the form of toothed gears which are respectively cylindrical toothed gears 32 on surface 30 associated with shaft 24 and a rack-shaped gear 53 on surface 31.

This joint works as follows.

If it is supposed that shaft 24 is the driving shaft and shaft 25 the driven shaft, the torque is transmitted from shaft 24 to yoke 26 through surfaces 30 and 31 having teeth 32 and 33 respectively, then from yoke 26 to shaft 25 through transverse shaft 27.

If the joint is deformed by a relative rotation of shafts 24 and 25 about the axis of shaft 27 from the position shown by Fig. 5, the whole of shaft 24, yoke 26 and bent member 29 then turns without being deformed about this axis.

If the joint is deformed due to a relative rotation of shafts 24 and 25 about an axis at right angles to the plane of Fig. 5 from the position shown on this figure, shaft 24 then rotates about its axis 28 and surface 30 with its teeth 32 moves upwardly or downwardly, thus driving in the same direction yoke 26.

If the joint is deformed by a relative rotation of shafts 1 and 2 about any axis whatever, the two deformations above described are combined. Therefore, the joint of Fig. 5 is capable of deforming freely while transmitting torque.

In the construction of Fig. 6, a double joint is obtained by constituting the two elements of every half of the joint, respectively by the driving shaft 34a or the driven shaft 34b and by an element common to the two halves, this element being for instance shaft 35. This shaft 35 carries two yokes 36a and 36b which are both slidable and rotatable on shaft 35, without being able to slide with respect to each other. Shafts 34a and 34b are respectively pivoted through axes 37a and 37b on U-shaped members 38a and 38b themselves pivoted on shaft 35. The end of shaft 34a is provided with a surface 39a and yoke 36a is provided with a surface 40a, these two surfaces 39a and 40a being adapted to roll without slipping on each other. For this purpose, for instance, they are provided with gear teeth. Shaft 34b and yoke 36b are similarly provided with surfaces 39b and 40b cooperating in the same manner.

The operation of every half of the joint located on either side of shaft 35 on Fig. 6 is identical to that of the joint of Fig. 5 as above explained.

It will be noted that the arrangement according to my invention makes it possible to compel a shaft such as 16 (Fig. 3) to have its axis constantly disposed along the bisector of the angle made by the axes of two shafts such as 11 and 12. The invention can therefore be used in universal joints of all types in which an intermediate shaft must be caused to occupy such a position with respect to the driving and driven shafts of the joint.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

A universal joint which comprises, in combination, a first shaft, a second shaft, each of said shafts defining an axis, an at least partly spherical member having a bore, the respective ends of said first shaft and said second shaft being provided with concave bearing surfaces adapted to fit on said spherical member, a transverse shaft slidable in the bore of said spherical member, two yokes mounted on said transverse shaft, at least one of the yokes being pivotally mounted on the transverse shaft, cooperating toothed devices carried by one of said yokes and said first shaft for enabling said first shaft to move with respect to said spherical member about an axis at right angles to said transverse shaft and to transmit torque from said first shaft to said spherical member, and cooperating toothed devices carried respectively by the other of said yokes and said second shaft for enabling said second shaft to move with respect to said spherical member with a rotation about an axis at right angles to said transverse shaft and for transmitting torque from said spherical member to said second shaft.

References Cited in the file of this patent

FOREIGN PATENTS

| | | |
|---|---|---|
| 694,747 | Germany | Aug. 7, 1940 |
| 714,773 | France | Sept. 14, 1931 |
| 997,928 | France | Sept. 19, 1951 |